(12) United States Patent
Lille

(10) Patent No.: US 7,466,516 B2
(45) Date of Patent: Dec. 16, 2008

(54) LEAD CONFIGURATION FOR REDUCED CAPACITIVE INTERFERENCE IN A MAGNETIC READ/WRITE HEAD

(75) Inventor: Jeffrey S. Lille, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 290 days.

(21) Appl. No.: 11/046,444

(22) Filed: Jan. 28, 2005

(65) Prior Publication Data

US 2006/0171076 A1 Aug. 3, 2006

(51) Int. Cl.
*G11B 5/60* (2006.01)
*G11B 5/33* (2006.01)
*G11B 5/127* (2006.01)

(52) U.S. Cl. .............. 360/234.5; 360/125.31; 360/125.74; 360/317

(58) Field of Classification Search ...... 360/234–234.6, 360/234.5, 125.31, 125.74, 317, 234.4
See application file for complete search history.

(56) References Cited

U.S. PATENT DOCUMENTS

| | | | | |
|---|---|---|---|---|
| 3,838,595 A * | 10/1974 | Godefroy | ............... | 73/776 |
| 4,951,120 A * | 8/1990 | Hagiwara et al. | ............ | 257/666 |
| 5,880,402 A * | 3/1999 | Nugent | ............... | 174/27 |
| 5,936,811 A * | 8/1999 | Seagle | ............... | 360/322 |
| 5,978,181 A | 11/1999 | Niijima et al. | ............... | 360/113 |
| 6,122,818 A * | 9/2000 | Lee | ............... | 29/603.12 |
| 6,134,089 A * | 10/2000 | Barr et al. | ............... | 360/322 |
| 6,158,108 A * | 12/2000 | Seagle | ............... | 29/603.14 |
| 6,341,415 B2 | 1/2002 | Amemiya et al. | ............... | 29/603.06 |
| 6,466,404 B1 * | 10/2002 | Crue et al. | ............... | 360/125.53 |
| 6,479,327 B2 * | 11/2002 | Takahashi et al. | ............... | 438/124 |
| 6,483,714 B1 * | 11/2002 | Kabumoto et al. | ............... | 361/760 |
| 6,493,183 B1 * | 12/2002 | Kasiraj et al. | ............... | 360/126 |
| 6,597,544 B2 | 7/2003 | Ghoshal | ............... | 360/317 |
| 7,133,254 B2 * | 11/2006 | Hamann et al. | ............... | 360/125.74 |
| 7,359,149 B2 * | 4/2008 | Kiyono et al. | ............... | 360/125.33 |
| 2001/0017820 A1 * | 8/2001 | Akiyama et al. | ............... | 369/13 |
| 2002/0044369 A1 | 4/2002 | Schaenzer et al. | ............... | 360/25 |
| 2003/0165034 A1 * | 9/2003 | Nikitin et al. | ............... | 360/322 |
| 2004/0027728 A1 * | 2/2004 | Coffey et al. | ............... | 360/313 |
| 2004/0057146 A1 | 3/2004 | Lee et al. | ............... | 360/46 |
| 2004/0201920 A1 * | 10/2004 | Koide et al. | ............... | 360/128 |

* cited by examiner

*Primary Examiner*—Brian E Miller
(74) *Attorney, Agent, or Firm*—Zilka-Kotab, PC

(57) ABSTRACT

A slider having a lead circuitry configured to minimize capacitive coupling between leads in a slider having a read head, a write head and an extra device such as a heater element. The leads are configures so that wherever a pair of leads cross one another, they do so at right angles or at nearly right angles. The leads can cross one another at angles of between 45 and 135 degrees, but preferably cross one another at an angle of about 90 degrees. The leads are electrically insulated from one another by a dielectric material formed between them. By crossing a pair of leads at right angles to one another, the overlapping area between the leads is minimized, thereby minimizing the capacitive coupling between them.

8 Claims, 11 Drawing Sheets

LEAD CONFIGURATION FOR REDUCED CAPACITIVE INTERFERENCE IN A MAGNETIC READ/WRITE HEAD

FIELD OF THE INVENTION

The present invention relates to the magnetic read write head circuitry and more particularly to a slider having circuitry arranged for minimizing capacitive coupling between read sensor circuitry and circuitry connected with an extra device, such as a heating element, incorporated into a read write head.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

One on-going objective in the industry is to improve or increase the amount of data that can be stored on a disk and to design magnetic heads which can adequately read from and write data to these disks. One promising technique to increase the disk storage capacity is heat assisted magnetic recording (HAMR), which may also be referred to as optically-assisted magnetic recording or thermally-assisted magnetic recording. This technique utilizes a recording medium that has a higher coercivity than current media so that it has more resistance to thermal instability at normal operating temperatures. Therefore, more data can be adequately stored on the media. Unfortunately, a higher coercivity means that the platter tends to resist reacting to magnetic fields at typical operating temperatures. Therefore, it is difficult to write to such media using conventional read write heads. To sufficiently write data to high coercivity media, a disk drive needs to heat a writable portion of the disk to lower its coercivity as the write head writes data thereto.

Heat assisted magnetic recording systems use heating devices such as a laser or an electrically resistive heating element. This heating element is incorporated into the head near the read and write elements in order to heat the medium at the location at which the write element is writing. Circuitry for applying electrical power to the heating element is incorporated with the circuitry for the read and write elements. Generally a pair of leads connected with the read element are connected with read head pads located on a surface of the slider body. Similarly, a pair of leads connected with the write element connect with write head pads on the surface of the slider body. These pads are used to connect the read/write circuitry on the slider with leads on the suspension body that connect with pre-amp circuitry which may or may not be located on the suspension arm.

The use of a heating device, of course, requires its own circuitry in addition to that for the read and write heads. The heating device may also require an additional pair of pads on the surface of the slider. The circuitry for the read sensor, write element and the heating element, as well as the associated pads for each of these devices are all located on a single surface of the slider at the trailing end of the slider. As can be appreciated, limited space area on the trailing end of the slider, as well manufacturing considerations, require that the circuitry for each of these devices (read sensor, write element and heater) be located in close proximity to one another. In addition, the lines of circuitry for these devices must cross over one another at some point, the lines of circuitry being separated from one another by a dielectric material such as for example photoresist or alumina ($Al_2O_3$).

A problem that arises as a result of using such additional heating devices in a heat assisted recording system is that the heater leads, which must at some point cross the read sensor leads, cause capacitive interference with the read sensor. As voltage is applied to the heater leads during a write operation, capacitive coupling with the read sensor leads results in a voltage in the adjacent read sensor leads. This causes the read sensor to inadvertently detect the heater voltage as a signal resulting in signal noise of such a degree that the heat assisted head becomes inoperable.

Therefore, there is a strong felt need for a head design that can allow the use of an extra device such as a heater in a magnetic read write head while minimizing capacitive coupling between the extra device and the read sensor. Such a head design would preferably not involve additional costly manufacturing processes, and would preferably incorporate existing manufacturing materials and processes.

SUMMARY OF THE INVENTION

The present invention provides a lead configuration for minimizing capacitive coupling in slider for use in a magnetic data recording system. The slider includes a read head, a write head, and an extra device, which may be for example a heating element. Lead circuitry connects the read head, write head and extra device with electrical contact pads on the slider. Capacitive coupling between various devices is minimized by ensuring that at any point at which a pair of lead cross one another, they do so at right angles, or nearly right angles, to one another.

The leads are separated from one another by a dielectric material, which can be for example alumina ($Al_2O_3$) or some other material. The leads may be separated from one another by a distance of 0.5-8 micrometers at the point at which the cross. The leads may cross one another at an angle of 45 to 135 degrees, or preferably 60 to 120 degrees, or more preferably about 90 degrees to one another.

The present invention allows an extra device, such as a heating element to be incorporated into a slider, while minimizing any increase in capacitive interference to the read sensor from the extra device. By ensuring that the leads cross one another at right angles, or nearly right angles, the overlapping area of the leads is minimized. Since capacitive coupling between the leads can be calculated as $C=[\in A]/Z$ where $\in$ is the dielectric coefficient of the insulating material between the leads, A is the area of the overlap between the leads and Z is the distance between the leads, minimizing the area of overlap between the leads results in minimized capacitive coupling between the leads.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
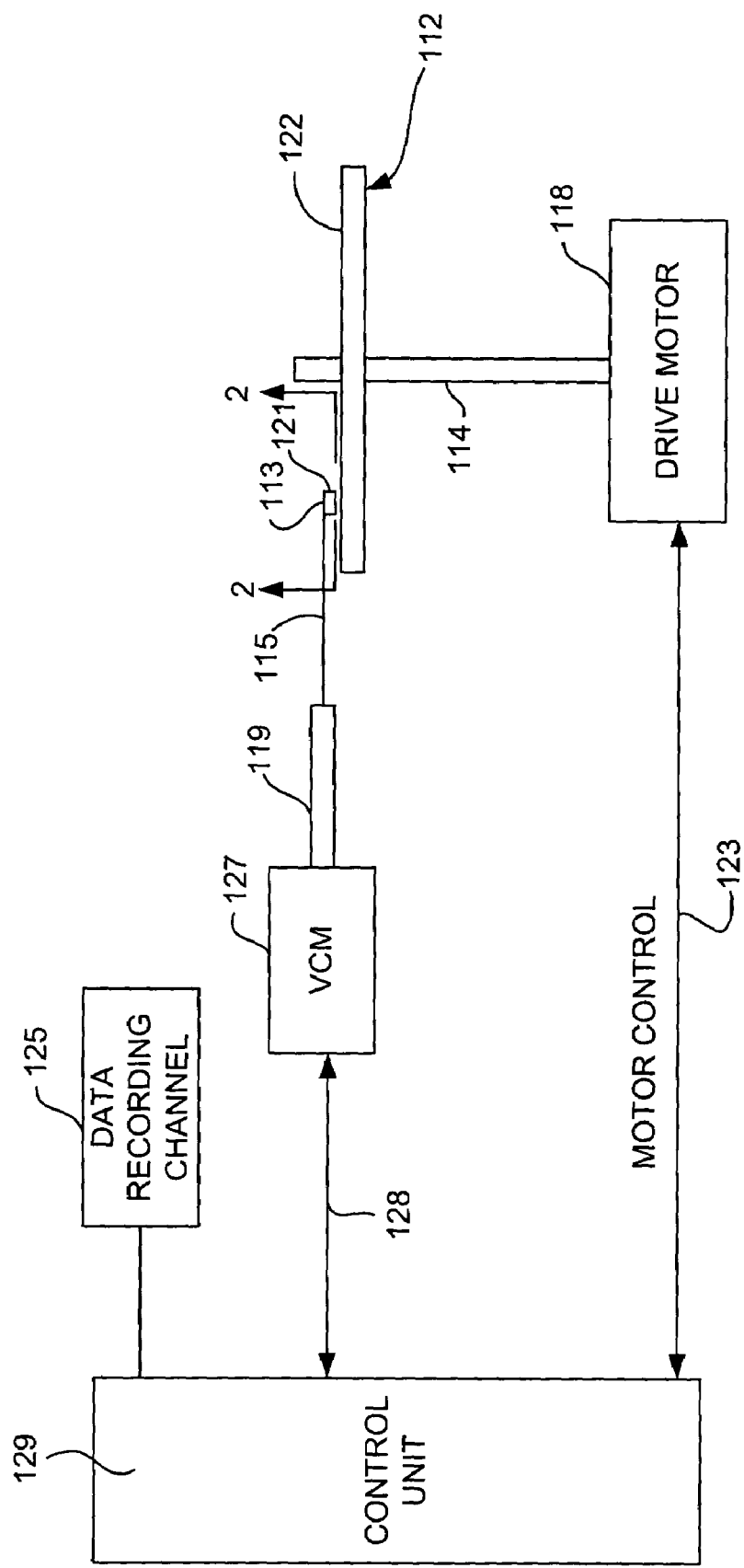
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
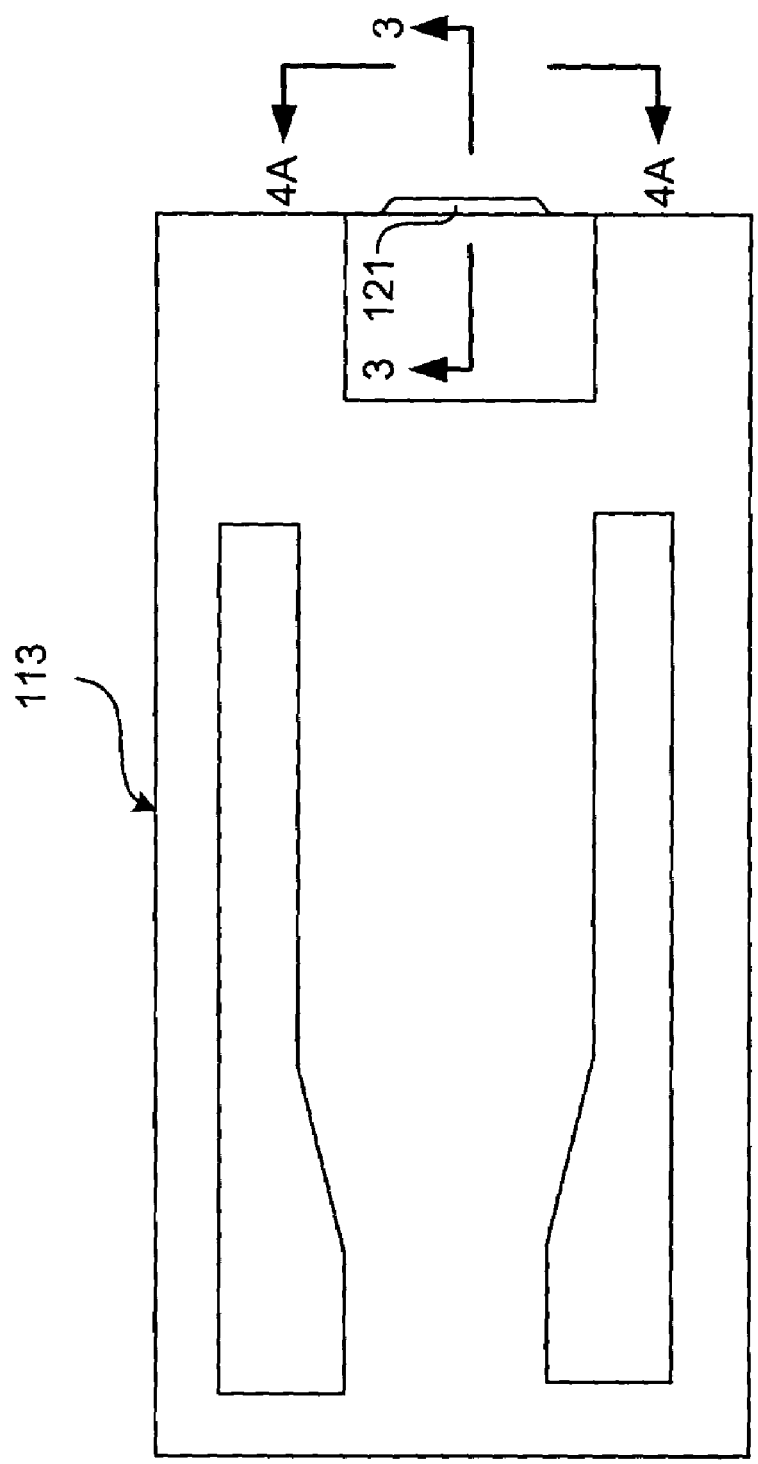
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head 112 including an inductive write head and a read sensor, is located at a trailing edge of the slider 113. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
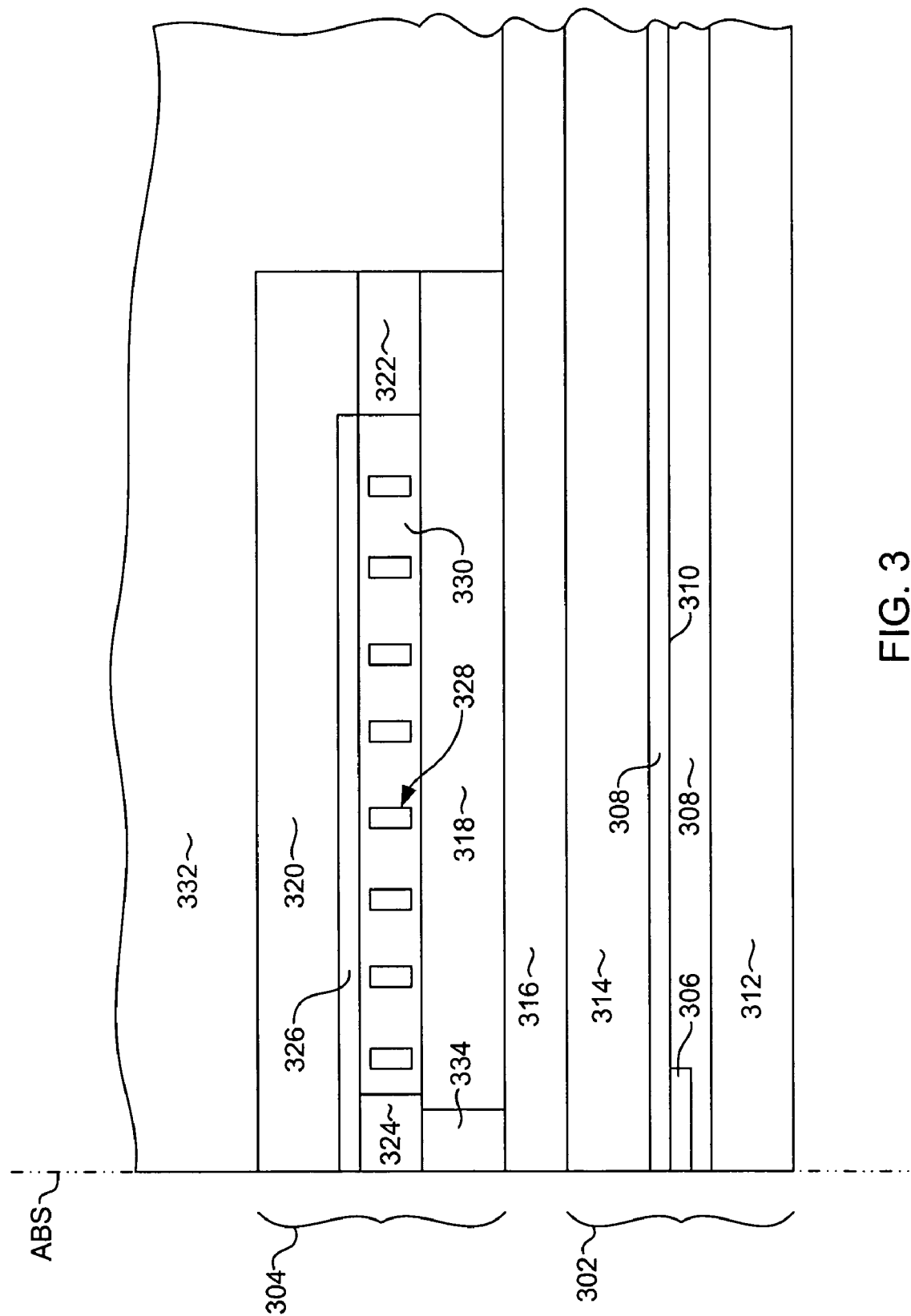
FIG. 3 is cross sectional view of a read/write head taken from line 3-3 of FIG. 2, rotated 90 degrees counter clockwise and enlarged.

With reference now to FIG. 3, a cross sectional view of a read head 302 and a write head 304 are illustrated. The read head includes a magnetoresitive sensor 306 such as a Giant Magnetoresistive (GMR) sensor embedded in one or more layers of electrically insulating material 308 such as alumina $Al_2O_3$ or some other material. Electrically conductive leads 310 extend from the sensor. The leads connect to the upper surface of the read and write heads 302, 306 through vias (not shown). First and second magnetic shields 312, 314 are provided at either side of the sensor and are insulated from the sensor 306 by the insulation layer 308. The magnetic shields 312, 314 absorb stray magnetic fields and define the length of a bit that the sensor 306 can detect.

The write head 304 may be separated from the read head 302 by an insulation layer 316. Alternatively, a merged head design could be used in which case the second shield 314 of the read head could also function as a fist pole of the write head 304. With continued reference to FIG. 3 the write head 304 may include first and second pole pieces 318, 320, magnetically connected with one another by a back gap portion 322 located away from the ABS. The write head may also include a magnetic pedestal 324. The first and second poles 318, 320 as well as the back gap 322 and pedestal 324 may be constructed of one or more magnetic materials such as NiFe or CoFe or some other magnetic material.

The first pole 318 and pedestal 324 are separated from the second pole in the pole tip region by a non-magnetic write gap layer 326, which may be constructed of several non-magnetic materials such as alumina $Al_2O_3$ or some other material. A write coil 328 (shown in cross section in FIG. 3) passes through the write head 304 between the first and second poles 318, 320, and is encased in a non-magnetic, electrically insulating material 330 such as alumina, hard baked photoresist or some other material. A layer of non-magnetic, dielectric material 332 covers the read and write heads 306, 304 to protect and electrically insulate the read and write heads. It should be pointed out the read and write head structures 302, 304 described with reference to FIG. 3 are for purposes of example and any type of read and write head could be incorporated in the present invention.

A heating element 334 is also formed on or within the write head element 304. In the embodiment shown, electrical element 334 is formed within the pole tip region of the write head 304 and is exposed at the ABS. For example, this element 334 could be a heater. The heating element could also be embedded within the pole tip of the write head 304 so that it is not exposed at the ABS. Heating element 334 is aligned with the pedestal 324 and pole tip of the second or upper pole 320 so that it is able to transfer heat to a writable portion of the disk just before the write head element writes data to it. The top surface of the disk is located below or in contact with the ABS of the head 304.

More generally, one could place the heater or some other electrical device in or near the head. The device and its properties will determine the actual location and nature of the device. Therefore, this non-reader and non-writer electrical element 334 would have leads that would be external to the head.

Figure 4A:
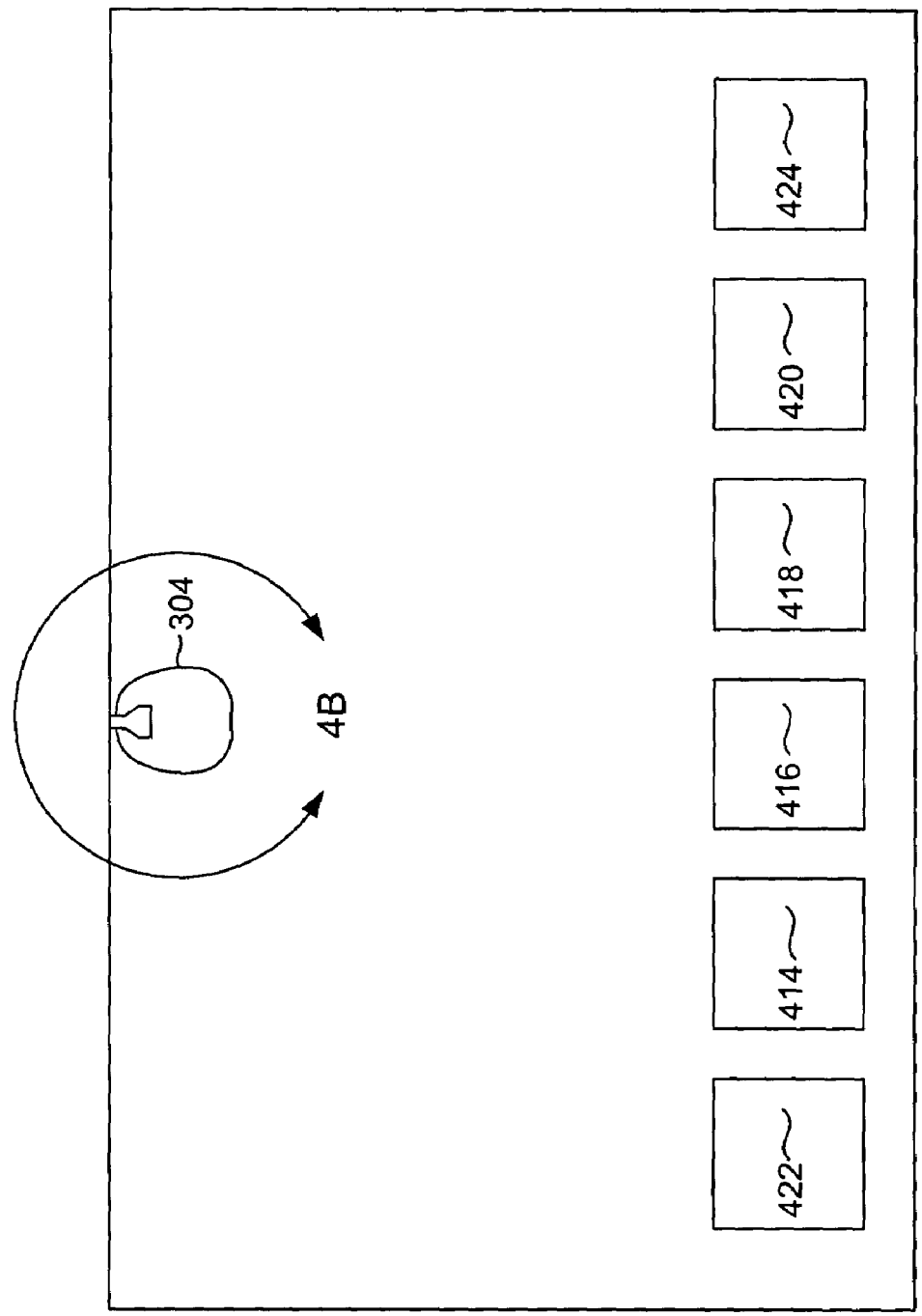
FIG. 4A is a view taken from line 4A-4A of FIG. 2, rotated 90 degrees clockwise and enlarged.
Figure 4B:
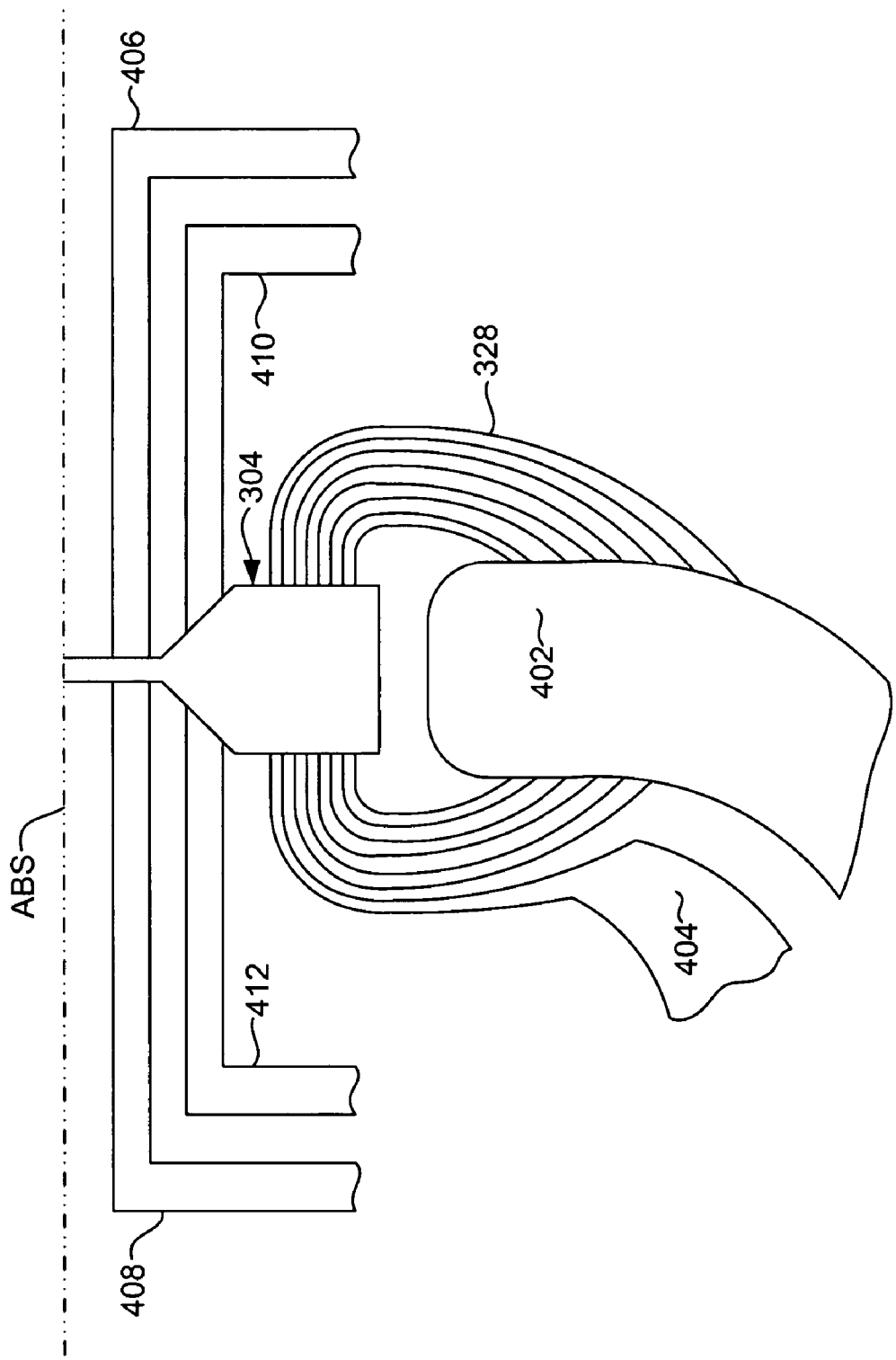
FIG. 4B is a view taken from circle 4B of FIG. 4A, shown enlarged.

With reference now to FIG. 4B, the write head 304 has first and second leads 402, 404 that extend from inner and outer portions respectively of the coil 328. The read head (hidden beneath the write head in FIG. 4B) also has a pair of leads 406, 408 that extend therefrom to provide sense current to the sensor 306 (FIG. 3). The heater element 334 (or other extra device) also has a pair of electrically conductive leads 410, 412.

With reference now to FIG. 4A, the leads 402, 404 from the write element connect with a pair of contact pads 414, 416. Similarly, the leads 406, 408 from the magentoresistive read head 306 connect with lead pads 418, 420, and leads from the heater or other extra device 334 connect with lead pads 422, 424. The lead pads 414-424 provide a point of contact for connecting with lead lines on the suspension (not shown) and eventually to pre-amp and control circuitry in the disk drive device.

Figure 5:
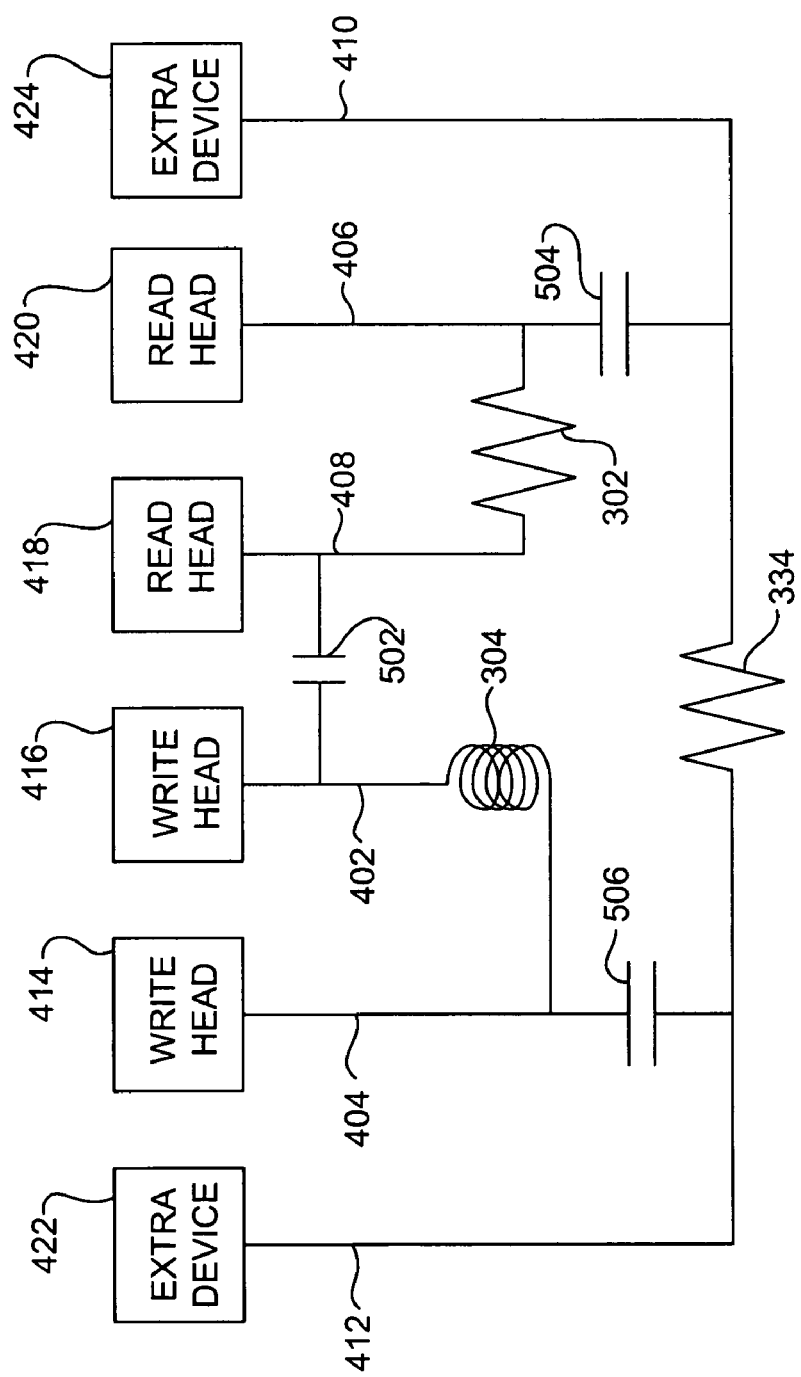
FIG. 5 is a schematic view of electrical lead circuitry for a read sensor, a write element and an extra device.

In order to rout the lead lines 402, 404, 406, 410, 412, 408 to the respective lead pads 414, 416, 418, 420, 422, the paths of the leads must at some point cross. Although the lead lines are electrically insulated from one another by one or more layers of dielectric material at the point at which they cross one another, a certain amount of capacitive interference inevitably exists. For example, with reference to FIG. 5 a schematic representation of a magnetic head 500 illustrates the effect of one device on another. The write head 304 is connected with lead pads 414, 416. Similarly, the read head 302 is connected with lead pads 418, 420. The heating element, or other extra device 334 is connected with lead pads 422, 424.

A certain amount of capacitive coupling 502 exists between the read and write heads 302, 304 due to their close proximity to one another and due to the close proximity of the read and write head leads. However as discussed above in the Background of the Invention, capacitive coupling problems occur when an extra device such as a heating element 334 is incorporated. At points where the lead lines 406, 408 of the read sensor 334 cross or pass nearby the leads 410, 412 of the extra device a capacitive coupling 504 exists between the extra device 334 and the read head 302. As a result, when a voltage is applied to the heating element 334 during a write operation, the read head 302 will pick up a signal resulting in an unacceptable level of signal noise.

Making maters worse, when a lead 402, 404 of the write head 304 crosses a lead 410, 414 of the heating element another capacitive coupling 506 occurs between the write element 304 and the heater 334. This capacitive coupling 506 from the write head can result in a signal being imparted from the write head 304 to the read head 302 via the capacitive coupling 504 between the heating element 334 and the read head 302.

Figure 6:
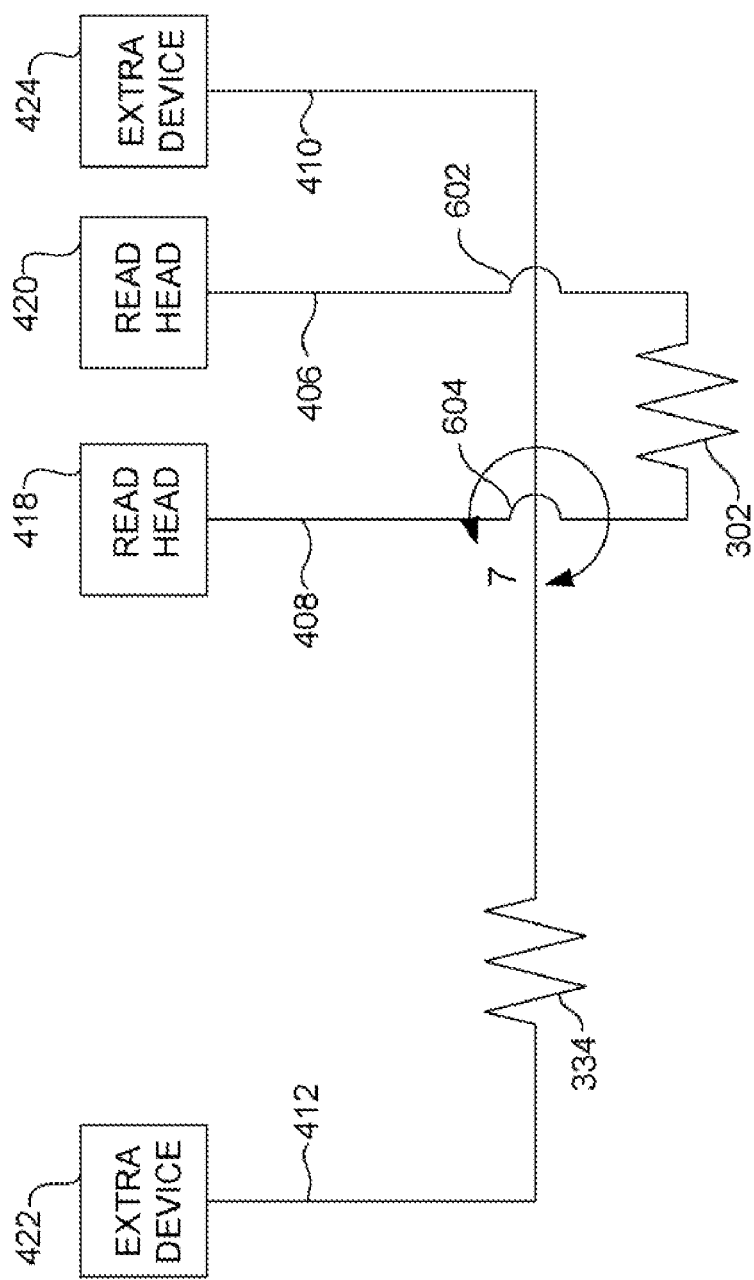
FIG. 6 is a schematic view of a relative arrangement of read sensor circuitry and circuitry of an extra device.

With reference now to FIG. 6, the manner in which capacitive coupling occurs can be more readily understood. For example at locations 602, 604 the leads 406, 408 pass over one or more of the leads 410, 412 of the heating element 334. The capacitive coupling between the two lines can be defined by the formula $C=[\in A]/Z$ where $\in$ is the dielectric coefficient of the insulating material between the leads, A is the area of the overlap between the leads and Z is the distance between the leads.

Figure 7:
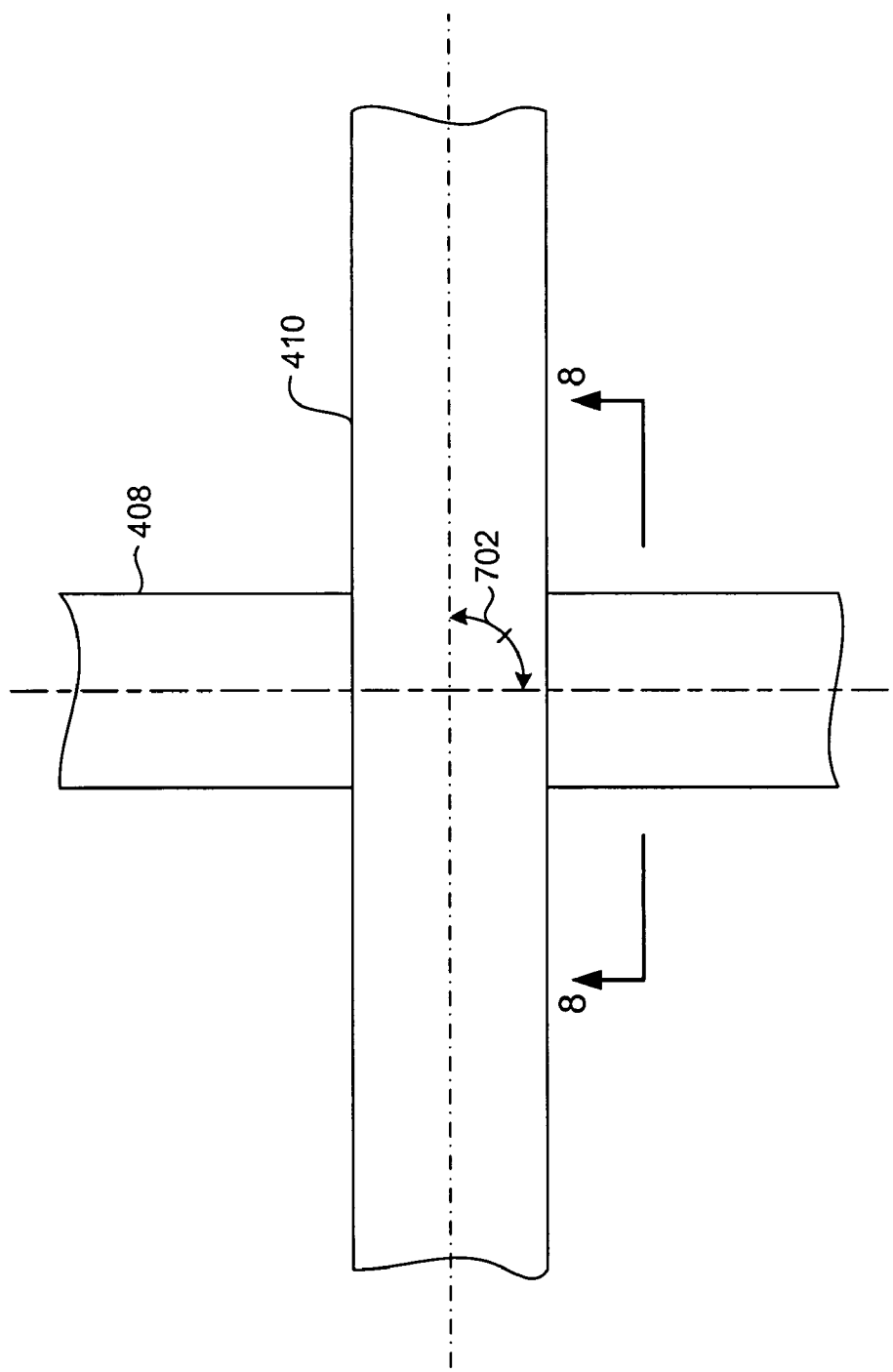
FIG. 7 is an enlarged view taken from circle 7 of FIG. 6 showing an arrangement of a read sensor lead and extra device lead.
Figure 8:
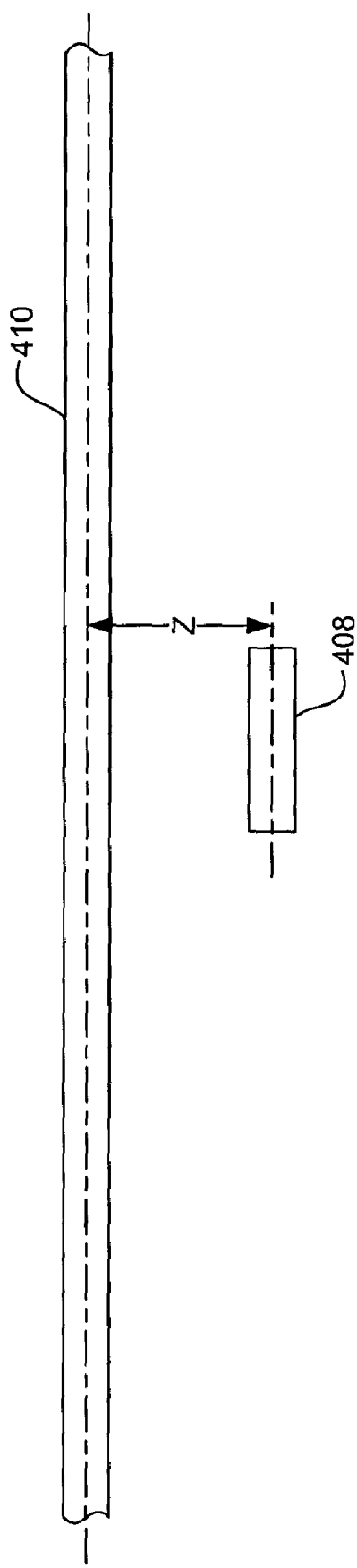
FIG. 8 is a view taken from line 8-8 of FIG. 7.

With reference to FIGS. 7 and 8, the present invention minimizes the capacitive coupling between leads in a magnetic head device by minimizing the area of overlap between the leads. With reference to FIG. 8, the distance Z between the leads is limited by design and manufacturing considerations and may range from 0.5 to 8 micrometers. The insulating materials be disposed between the leads 408, 410 is preferably alumina $Al_2O_3$, which provides both excellent electrical insulation as well as physical hardness. The dielectric constant of alumina is about $8\in_0$ where $\in_0$ is the permittivity of air With reference to FIG. 7, the leads 408, 410, although they do not intersect one another, are perpendicular to one another as viewed from above in FIG. 7. That is, the leads 408, 410 form an angle 702 of 145 to 135 degrees, preferably 60 to 120 degrees, or more preferably about 90 degrees with respect to one another. More technically speaking, the superposition of the leads onto a plane that is parallel with both leads 408, 410 defines an angle 702 of 60 to 120 or more preferably about 90 degrees.

It should be pointed out that the above description with reference to leads 408 and 410 is by way of example, and the present invention applies to any and all leads that may have to cross one another in the design of a slider. Preferably, at any point at which any leads of different devices cross one another, such leads would cross each other at right angles with respect to one another.

By laying out the various leads so that they cross at right angles to one another, the overlapping area is minimized, thereby resulting in minimized capacitive coupling between the leads. If the leads cross at right angles to one another, then the overlapping area is just the width of the first lead multiplied by the width of the second lead. By contrast, if the leads were formed parallel at angle other than 90 degrees to one another such as 45 degrees, the overlapping area would be a trapezoid having a larger area.

While the electrical element 334 has been described above as being connected with its own dedicated lead pads 422, 424, it could also be connected at one end to a dedicated lead pad, and at the other end to a lead pad shared in common with the write head 304. Alternatively, the heating element could be connected with the both write head lead pads 414, 416. In either case, the electrical element 334 would be driven by the write head circuitry to operate simultaneously with the write head. The electrical element 334 may be coupled to one of the write head pads 414, 416 (which may be grounded) and may be connected to another separate heater pad exposed on the slider. In this case, the electrical element 334 is driven by a driver circuit which is coupled to a separate pad as well (and may be grounded). Preferably, the electrical element driver circuit is not exposed on the outside of the magnetic head but is contained at a location away therefrom. For example, the driver circuit may be included in the same area where the arm electronics (AE) are located, or on the circuit board card attached to the base of the driver.

Figure 9:
FIG. 9 is a graph illustrating a relationship between temperature and magnetic coercivity of a magnetic medium.

FIG. 9 is a graph 900 which illustrates the basic relationship between temperature x-axis) and media coercivity Hc(y-axis). A curve 902 shown in graph 900 reveals that the coercivity of a writable media, such as a magnetic disk, decreases as its temperature increases. Although shown as a linear relationship in FIG. 9 for simplicity, the relationship between temperature and coercivity may or may not be linear. In the present state-of-the-art, a conventional magnetic disk has a coercivity of between about 2000 and 4000 Oersteds at a typical operating temperature and can store between about 1 $Gb/in^2$ and 60 $Gb/in^2$ of data. For such a disk to be sufficiently written to, a writable portion of the disk is heated to between about 80 and 300 degrees Celsius to lower its coercivity to between about 2000 and 6000 Oersteds. As described herein, the heating element of the magnetic head is the component which provides the heat to lower the disk's coercivity. Note that the coercivities and storage capacities just described are merely those which are suitable values at the present time and will likely change in the future.

Figure 10:
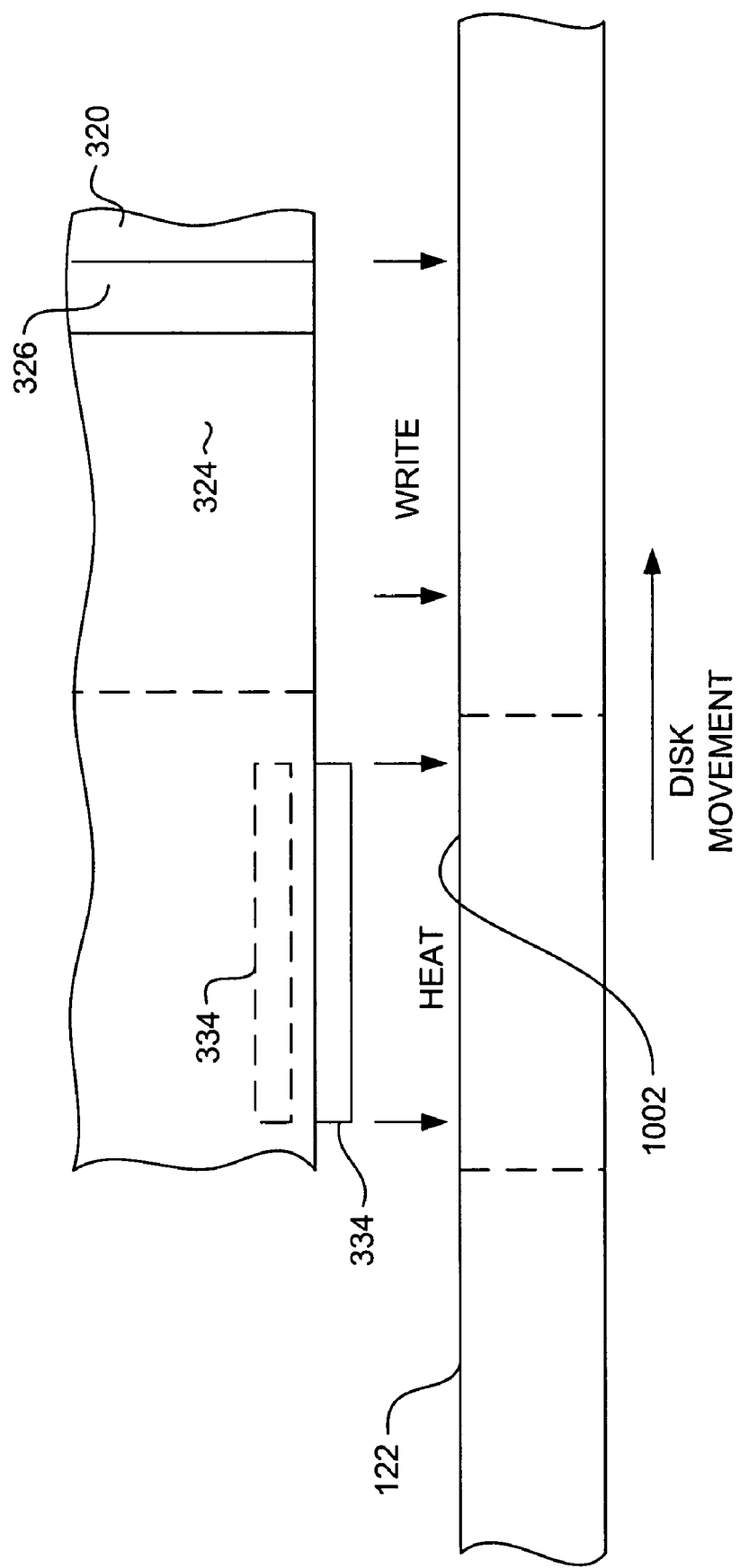
FIG. 10 is a cross sectional illustration of a heating element in a magnetic head according to a possible embodiment of the invention.

FIG. 10 is a simplified cross sectional view of electrical element 334, disk 122 and pole pedestal portion 324, write gap 326 and pole 320. As illustrated, a possible heating element 334 is formed beneath or under the tip of the first pole piece 318 at the ABS. The element 334 is positioned on the write head element such that it is aligned with the pedestal portion 324 so that heat can be thermally transferred to a writable portion 1002 of the disk 221 before data is written to it. When energized, heating element 334 heats up a portion of the slider (e.g., a portion of the first pedestal 324 first and second pole pieces 318, 324) through radiation or conduction (thermal contact) and writable disk portion 1002 will be underneath the pole piece pedestal 324 and remain at an elevated temperature when being written to. By heating up the writable disk portion 1002, the bits therein are made writable such that the write head element can write data thereto. The exact location of the heating element may vary and, as illustrated in dashed lines in FIG. 10, it may be formed within the pole 318 where it is not exposed at the ABS.

Preferably, heating element 334 is an electrically resistive heater (i.e. a resistive infrared radiator) which rises in temperature when an electrical current flows through it. Heating element 334 has a high resistance, preferably between about 25 and 250 ohms, which does not vary significantly when energized. When energized, heating element 334 heats up to a steady state temperature of between about 80-400 degrees Celsius. For example, heating element 334 may have a predetermined steady state temperature of 150 degrees Celsius when data is being written. Also, the heating element may have a power dissipation of between about 5 and 20 milliwatts, or more particularly a power dissipation of about 10 milliwatts.

Heating element 334 is made of a suitable conductive material, preferably a metal or metal alloy such as tantalum or $Ni_{80}Cr_{20}$, which is formed underneath the pole piece by sputter deposition. Heating element 334 may be made of a NICHROME® material, which is basically an alloy of nickel and chromium. NICHROME® is a registered trademark of the Driver-Harris Company. The leads 410, 412 to heating element 334 are also made of a conductive material, such as platinum or an alloy of nickel. An additional layer of metal, such as copper (Cu), may be formed underneath heating element 334 to carry heat away from the magnetic head.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A slider for magnetic recording comprising:
    a slider body;
    a magnetoresistive read sensor formed on the slider body;
    an inductive write head formed on the slider body;
    an electrical element; formed on the slider body;
    first and second contact pads;
    first and second leads connecting the magnetoresistive sensor with the first and second contact pads;
    third and fourth contact pads;
    third and forth leads connecting the inductive write element with the third and fourth contact pads;
    fifth and sixth contact pads; and
    fifth and sixth leads connecting the electrical element with the fifth and sixth contact pads; and wherein at least one of the first and second leads crosses at least one of the fifth and sixth leads at an angle of between 45 and 135 degrees, the at least one lead being separated from the at least one fifth and sixth lead by a dielectric material; wherein the inductive write head further comprises a first magnetic pole, a second magnetic pole and a magnetic pedestal magnetically connected with the first magnetic pole, and wherein the electrical heater element is formed beneath and aligned with the magnetic pedestal portion, and further comprising a thermally conductive Cu layer formed beneath the electrical heater for conducting heat away from the write head.

2. A slider as in claim 1, wherein the at least one first and second lead crosses the at least one fifth and sixth lead at an angle of about 90 degrees.

3. A slider as in claim 1 wherein the at least one first and second lead is separated from the at least one fifth and sixth lead by a distance of 0.5-8 micrometers.

4. A slider as in claim 1 wherein the dielectric material comprises an oxide.

5. A slider as in claim 1 wherein at least one of the first and second leads crosses at least one of the third and forth leads at an angle of 45 to 135 degrees, the at least one of the first and second lead being separated from the at least one third and fourth lead by a dielectric material disposed therebetween.

6. A disk drive system, comprising:
    a housing;
    a magnetic disk mounted for rotation within the housing;
    an actuator, pivotally mounted within the housing;
    a slider connected with the actuator for movement adjacent to a surface of the magnetic disk, the slider comprising:
    a slider body;
    a magnetoresistive read sensor formed on the slider body;
    an inductive write head formed on the slider body;
    an extra electrical device; formed on the slider body;
    first and second contact pads;
    first and second leads connecting the magnetoresistive sensor with the first and second contact pads;
    third and fourth contact pads;
    third and forth leads connecting the inductive write element with the third and fourth contact pads;
    fifth and sixth contact pads; and
    fifth and sixth leads connecting the extra electrical device with the fifth and sixth contact pads; and wherein at least one of the first and second leads crosses at least one of the fifth and sixth leads at an angle of between 75 and 135 degrees, the at least one lead being separated from the at least one fifth and sixth lead by a dielectric material; wherein the inductive write head further comprises a first magnetic pole, a second magnetic pole and a magnetic pedestal magnetically connected with the first magnetic pole, and wherein the electrical heater element is formed beneath and aligned with the magnetic pedestal portion, and further comprising a thermally conductive Cu layer formed beneath the electrical heater for conducting heat away from the write head.

7. A disk drive as in claim 6 wherein the at least one first and second lead crosses the at least one fifth and sixth lead at an angle of about 90 degrees.

8. A disk drive as in claim 6 wherein the dielectric material comprises an oxide, and wherein the at least one first and second lead is separated from the at least one fifth and sixth lead by a distance of 0.5-8 micrometers.

* * * * *

UNITED STATES PATENT AND TRADEMARK OFFICE
CERTIFICATE OF CORRECTION

PATENT NO.        : 7,466,516 B2                                                Page 1 of 1
APPLICATION NO.   : 11/046444
DATED             : December 16, 2008
INVENTOR(S)       : Lille It is certified that error appears in the above-identified patent and that said Letters Patent is hereby corrected as shown below:

In claim 1, column 9, line 14, replace "forth" with --fourth--.

In claim 5, column 10, line 1, replace "second lead being" with --second leads being--.

Signed and Sealed this

Third Day of August, 2010

David J. Kappos
*Director of the United States Patent and Trademark Office*